(12) United States Patent
Zazoum

(10) Patent No.: US 11,345,101 B2
(45) Date of Patent: May 31, 2022

(54) POLYMER COMPOSITE MATERIAL HAVING ORIENTED ELECTRICALLY AND THERMALLY CONDUCTIVE PATHWAYS

(71) Applicant: Prince Mohammad Bin Fahd University, Dhahran (SA)

(72) Inventor: Bouchaib Zazoum, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 17/362,292

(22) Filed: Jun. 29, 2021

(65) Prior Publication Data

US 2021/0323255 A1 Oct. 21, 2021

Related U.S. Application Data

(62) Division of application No. 16/828,443, filed on Mar. 24, 2020, now Pat. No. 11,130,296.

(51) Int. Cl.

| | |
|---|---|
| *B29C 71/00* | (2006.01) |
| *B29C 67/24* | (2006.01) |
| *B29C 43/00* | (2006.01) |
| *B29C 70/88* | (2006.01) |
| *B29C 70/58* | (2006.01) |
| *B29C 35/12* | (2006.01) |
| *B29C 59/10* | (2006.01) |
| *C04B 35/465* | (2006.01) |
| *B82Y 40/00* | (2011.01) |
| *C08K 3/22* | (2006.01) |
| *B29K 509/02* | (2006.01) |
| *B29K 33/00* | (2006.01) |
| *C08L 23/00* | (2006.01) |
| *B01J 23/00* | (2006.01) |
| *C04B 35/462* | (2006.01) |
| *C08L 23/06* | (2006.01) |
| *B29K 23/00* | (2006.01) |
| *B29K 509/00* | (2006.01) |
| *B82Y 30/00* | (2011.01) |
| *C04B 35/468* | (2006.01) |

(52) U.S. Cl.
CPC .......... *B29C 71/0081* (2013.01); *B29C 35/12* (2013.01); *B29C 43/006* (2013.01); *B29C 59/10* (2013.01); *B29C 67/243* (2013.01); *B29C 70/58* (2013.01); *B29C 70/882* (2013.01); *C04B 35/465* (2013.01); *B01J 23/002* (2013.01); *B29C 43/003* (2013.01); *B29K 2023/0633* (2013.01); *B29K 2033/00* (2013.01); *B29K 2509/00* (2013.01); *B29K 2509/02* (2013.01); *B82Y 30/00* (2013.01); *B82Y 40/00* (2013.01); *C01P 2002/34* (2013.01); *C04B 35/462* (2013.01); *C04B 35/4682* (2013.01); *C08K 2003/2237* (2013.01); *C08K 2201/005* (2013.01); *C08L 23/00* (2013.01); *C08L 23/06* (2013.01); *C08L 2203/20* (2013.01); *C08L 2207/066* (2013.01); *Y10S 502/525* (2013.01)

(58) Field of Classification Search
CPC ............... C04B 14/305; C04B 35/465; C08K 2003/2237; C08K 2201/005; C08L 23/06; C08L 2203/20; C08L 2207/066; B29C 35/12; B29C 43/006; B29C 59/10; B29C 67/243; B29C 70/58; B29C 70/882; B29C 71/0081

See application file for complete search history.

(56) References Cited

U.S. PATENT DOCUMENTS

| | | |
|---|---|---|
| 4,145,565 A | 3/1979 | Donon |
| 4,661,537 A | 4/1987 | Ancker |
| 5,997,800 A | 12/1999 | Wimberger Friedl |
| 6,400,093 B1 | 6/2002 | Baumberg |
| 7,068,898 B2 | 6/2006 | Buretea |
| 8,562,871 B2 | 10/2013 | Khatua |
| 8,889,472 B2 | 11/2014 | Miller |
| 10,738,177 B2 | 8/2020 | Lee |
| 2006/0078492 A1 | 4/2006 | Kurozumi |
| 2007/0205389 A1 | 9/2007 | Kurozumi |
| 2008/0006796 A1 | 1/2008 | Khatua |
| 2008/0103216 A1 | 5/2008 | Nakatsuka |
| 2012/0115989 A1 | 5/2012 | Tuncer et al. |
| 2017/0301466 A1 | 10/2017 | Sherman et al. |
| 2017/0321023 A1 | 11/2017 | Ali |
| 2018/0134866 A1 | 5/2018 | Akyurtlu et al. |
| 2019/0229255 A1 | 7/2019 | Yasuda |
| 2019/0291364 A1 | 9/2019 | O'Connor |

FOREIGN PATENT DOCUMENTS

| | | |
|---|---|---|
| CN | 103665525 A | 3/2014 |
| CN | 103694550 A | 4/2014 |

(Continued)

OTHER PUBLICATIONS

Martinez-Tarifa, J. M., et al. "Uniformly dispersed submicrometric BaTiO 3 particles in HDPE based composites morphology, structure and dielectric properties." 2013 IEEE International Conference on Solid Dielectrics (ICSD). IEEE, Jun. 30, 2013. (Year: 2013).

(Continued)

*Primary Examiner* — Edward J Cain
(74) *Attorney, Agent, or Firm* — Oblon, McClelland, Maier & Neustadt, L.L.P.

(57) ABSTRACT

A method of forming a polyolefin-perovskite nanomaterial composite which contains oriented electrically and thermally conductive pathways. The method involves milling a polyolefin with particles of a perovskite nanomaterial, molding to forma composite plate, and subjecting the composite plate to an AC voltage. The AC voltage forms oriented electrically and thermally conductive pathways by partial dielectric breakdown of the composite. The presence of the oriented electrically and thermally conductive pathways gives the polyolefin-perovskite nanomaterial electrical and thermal conductivity and dielectric permittivity higher than the polyolefin alone.

8 Claims, 4 Drawing Sheets

(56) References Cited

FOREIGN PATENT DOCUMENTS

| CN | 103709478 A | 4/2014 |
|---|---|---|
| CN | 109354756 A | 2/2019 |
| CN | 109378122 A | 2/2019 |
| CN | 110172322 A | 8/2019 |
| JP | 57-65741 A | 4/1982 |
| WO | WO 2019099603 A1 | 5/2019 |

OTHER PUBLICATIONS

Su, Jun, and Jun Zhang. "Effect of arrangement of nano and micro barium titanate (BaTiO3) particles on the enhanced dielectric constant of high-density polyethylene (HDPE)/BaTiO3." Journal of Polymer Science Part B: Polymer Physics 56.15 (Jun. 26, 2018): 1101-1108. (Year: 2018).

Khalil, M. Salah. "The role of BaTiO/sub 3/in modifying the dc breakdown strength of LDPE." IEEE Transactions on Dielectricsand Electrical Insulation 7.2 (Apr. 2000): 261-268. (Year: 2000).

Gonzalez Benito, J., et al. "Composites based on HDPE filled with BaTiO3 submicrometric particles. Morphology, structure and dielectric properties." Polymer Testing 32.8 (Sep. 2, 2013): 1342-1349. (Year: 2013)

J. M. Martínez-Tarifa, et al., "Uniformly dispersed submicrometric BaTiO3particles in HDPE based composites morphology, structure and dielectric properties", IEEE International Conference on Solid Dielectrics (ICSD), Jun. 30-Jul. 4, 2013, 3 pages (Abstract only).

J. Gonzalez Benito, et al., "Composites based on HDPE filled with $BaTiO_3$ submicrometric particles. Morphology, structure and dielectric properties", Polymer Testing, vol. 32, Issue 8, Dec. 2013, pp. 1342-1349 (Abstract only).

Jun Su, et al., "Effect of arrangement of nano and micro barium titanate ($BaTiO_3$) particles on the enhanced dielectric constant of high-density polyethylene (HDPE)/$BaTiO_3$", Journal of Polymer Science Part B: Polymer Physics, vol. 56, Issue 15, Jun. 26, 2018, pp. 1101-1108 (Abstract only).

M. Salah Khalil, "The role of BaTiO/sub 3/ in modifying the dc breakdown strength of LDPE", IEEE Transactions on Dielectrics and Electrical Insulation, vol. 7, Issue 2, April 2000, pp. 261-268 (Abstract only).

POLYMER COMPOSITE MATERIAL HAVING ORIENTED ELECTRICALLY AND THERMALLY CONDUCTIVE PATHWAYS

CROSS-REFERENCE TO RELATED APPLICATIONS

The present application is a Divisional of U.S. application Ser. No. 16/828,443, now allowed, having a filing date of Mar. 24, 2020. The present application is related to U.S. application Ser. No. 16/989,367, having a filing date of Aug. 10, 2020, now U.S. Pat. No. 10,899,092 which is a Continuation of U.S. application Ser. No. 16/828,443.

BACKGROUND OF THE INVENTION

Technical Field

The present invention relates to a method of preparing a polyolefin-perovskite nanomaterial composite utilizing application of an AC voltage, and a polyolefin-perovskite nanomaterial composite made by the method, optionally having oriented electrically and thermally conductive pathways.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Polyolefins have a number of properties that are advantageous for applications in a wide variety of products and industries such as consumer goods, packaging, medical products, and safety equipment. Specifically, the low electrical and thermal conductivity of polyolefins help to prevent the risk of electrical shock or thermal burns. The same low electrical and thermal conductivity, however, is disadvantageous for use in certain electronics applications where higher values of these properties are desirable.

A common strategy for changing the physical properties of polymers is to create polymer composites by blending other materials with the polymer. Such composites may have altered characteristics such as dielectric permittivity, electrical conductivity, Young's modulus, flexibility, toughness, degradation resistance, and others. The inclusion of nanomaterials into polyolefins is often done to enhance the electrically-insulating nature of the polyolefin. The incorporation of some types of nanomaterials causes an increase in the dielectric breakdown strength and a decrease in the dielectric permittivity of the composite compared to the polyolefin alone [Ma, et. al., Nanotechnology, 2005, 16, 6, 724—incorporated herein by reference in its entirety]. This decrease in dielectric permittivity and increased dielectric breakdown strength is attributed to the ability of the nanomaterial to change the spatial charge distribution in the polyolefin matrix and to reduce the internal electric field produced in the composite upon voltage application [Easaee, et. al., Journal of Nanomaterials, 2018, Article ID 7921725—incorporated herein by reference in its entirety]. Further, the dielectric breakdown strength of polyolefins is increased due to the ability of the nanomaterial to suppress "electrical treeing", the dendritic growth of electrically conductive pathways in the polyolefin matrix caused by partial dielectric breakdown [Tanaka, 2016, In: Polymer Nanocomposites, Huang X., Zhi C. (eds), Springer, Cham—incorporated herein by reference in its entirety]. The particles of the nanomaterial act as termination points for the electrically conductive pathways, suppressing the continued growth and branching. While the decrease in the dielectric permittivity may be advantageous for creating a highly insulating polyolefin material for insulating applications, this lower dielectric permittivity may be disadvantageous for other applications.

A polyolefin-based composite with higher electrical and thermal conductivity and higher dielectric permittivity compared to the polyolefin alone, however, would be advantageous for use in electronics applications. Such a composite could take advantage of the properties of the polyolefin such as flexibility, toughness, and degradation resistance and have the required electrical and thermal conductivities for applications such as batteries, solar cells, electrodes, or electronics packaging. Such a material would rely on careful choice of the appropriate nanomaterial and processing or preparation methods to achieve increased, as opposed to decreased, dielectric permittivity.

In view of the foregoing, one objective of the present invention is to provide a method for preparing a polyolefin-nanomaterial composite with higher electrical and thermal conductivity and higher dielectric permittivity compared to the parent polyolefin by the incorporation of a perovskite nanomaterial. It is a further objective of the present invention is to provide a nanocomposite material having increased dielectric permittivity and electrically and thermally conductive pathways, e.g., formed from application of AC voltage.

BRIEF SUMMARY OF THE INVENTION

According to a first aspect, the present disclosure relates to a method of making a polyolefin-perovskite nanomaterial composite comprising mixing a perovskite nanomaterial with a polyolefin powder to form a mixture, ball milling the mixture in a high-energy shaker to form a composite powder, molding the composite powder to form a composite plate, and subjecting the composite plate to an AC voltage of 1 to 50 kV/mm to form the polyolefin-perovskite nanomaterial composite.

In some embodiments, the AC voltage has a frequency of 50 to 70 Hz.

In some embodiments, the polyolefin-perovskite nanomaterial composite comprises a polyolefin matrix, particles of a perovskite nanomaterial uniformly distributed in the polyolefin matrix, and oriented electrically and thermally conductive pathways.

In some embodiments, the polyolefin matrix is present in the polyolefin-perovskite nanomaterial composite in an amount of 90 to 99 wt %, and the perovskite nanomaterial is present in the polyolefin-perovskite nanomaterial composite in an amount of 1 to 10 wt %, each based on a total weight of the polyolefin-perovskite nanomaterial composite.

In some embodiments, the AC voltage is applied by placing the composite plate on a supporting ground electrode and placing a needle electrode into the composite plate such that the needle electrode does not contact the supporting ground electrode and the supporting ground electrode and needle electrode are separated by a distance of at least 30% of a thickness of the composite plate.

In some embodiments, the supporting ground electrode, the composite plate, and the needle electrode are immersed in a non-conductive liquid medium during the subjecting.

In some embodiments, the oriented electrically and thermally conductive pathways comprise dendritic conductive channels in the polyolefin matrix which originate and terminate at at least one selected from the group consisting of an exterior surface of the composite, a channel created by the needle electrode, and a particle of the perovskite nanomaterial.

In some embodiments, an oriented electrically and thermally conductive pathway, optionally together with one or more additional pathways and/or one or more particles of perovskite nanomaterial, comprises a path along which electricity may flow that spans a thickness of the polyolefin-perovskite nanomaterial composite.

In some embodiments, the polyolefin is polyethylene.

In some embodiments, the polyethylene is low density polyethylene.

In some embodiments, the low density polyethylene has a density of 0.88 to 0.96 g/cm$^3$ and a melt flow index of 0.2 to 2.5 g/10 minutes.

In some embodiments, the perovskite nanomaterial is barium titanate nanoparticles.

In some embodiments, the composite plate has a real dielectric permittivity of 2.0 to 3.0 at 1 kHz.

In some embodiments, the polyolefin-perovskite nanomaterial composite has a thermal conductivity of 0.1 $Wm^{-1}K^{-1}$ to 500 $Wm^{-1}K^{-1}$, an electrical conductivity of $10^{-12}$ S/m to $10^2$ S/m, and a dielectric permittivity of 3.1 to 50 at 1 kHz.

The current disclosure also relates to a polyolefin-perovskite nanomaterial composite, comprising a polyolefin matrix in an amount of 90 to 99 wt %, based on a total weight of the polyolefin-perovskite nanomaterial composite, perovskite nanomaterial present in an amount of 1 to 10 wt %, based on a total weight of the polyolefin-perovskite nanomaterial composite, and oriented electrically and thermally conductive pathways comprising either hollow channels in the polyolefin matrix or material formed from electrical damage of the polyolefin matrix that has a distinct chemical composition from the polyolefin matrix.

In some embodiments, the polyolefin matrix comprises polyethylene.

In some embodiments, the polyethylene is low density polyethylene.

In some embodiments, the low density polyethylene has a density of 0.88 to 0.96 g/cm$^3$ and a melt flow index of 0.2 to 2.5 g/10 minutes.

In some embodiments, the perovskite nanomaterial is barium titanate nanoparticles.

In some embodiments, the oriented electrically and thermally conductive pathways comprise dendritic conductive channels in the polyolefin matrix which originate and terminate at at least one selected from the group consisting of an exterior surface of the composite, a channel created by the needle electrode, and a particle of the perovskite nanomaterial.

In some embodiments, the polyolefin-perovskite nanomaterial composite has a thermal conductivity of 0.1 $Wm^{-1}K^{-1}$ to 500 $Wm^{-1}K^{-1}$, an electrical conductivity of $10^{-12}$ S/m to $10^2$ S/m, and a dielectric permittivity of 3.1 to 50 at 1 kHz.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
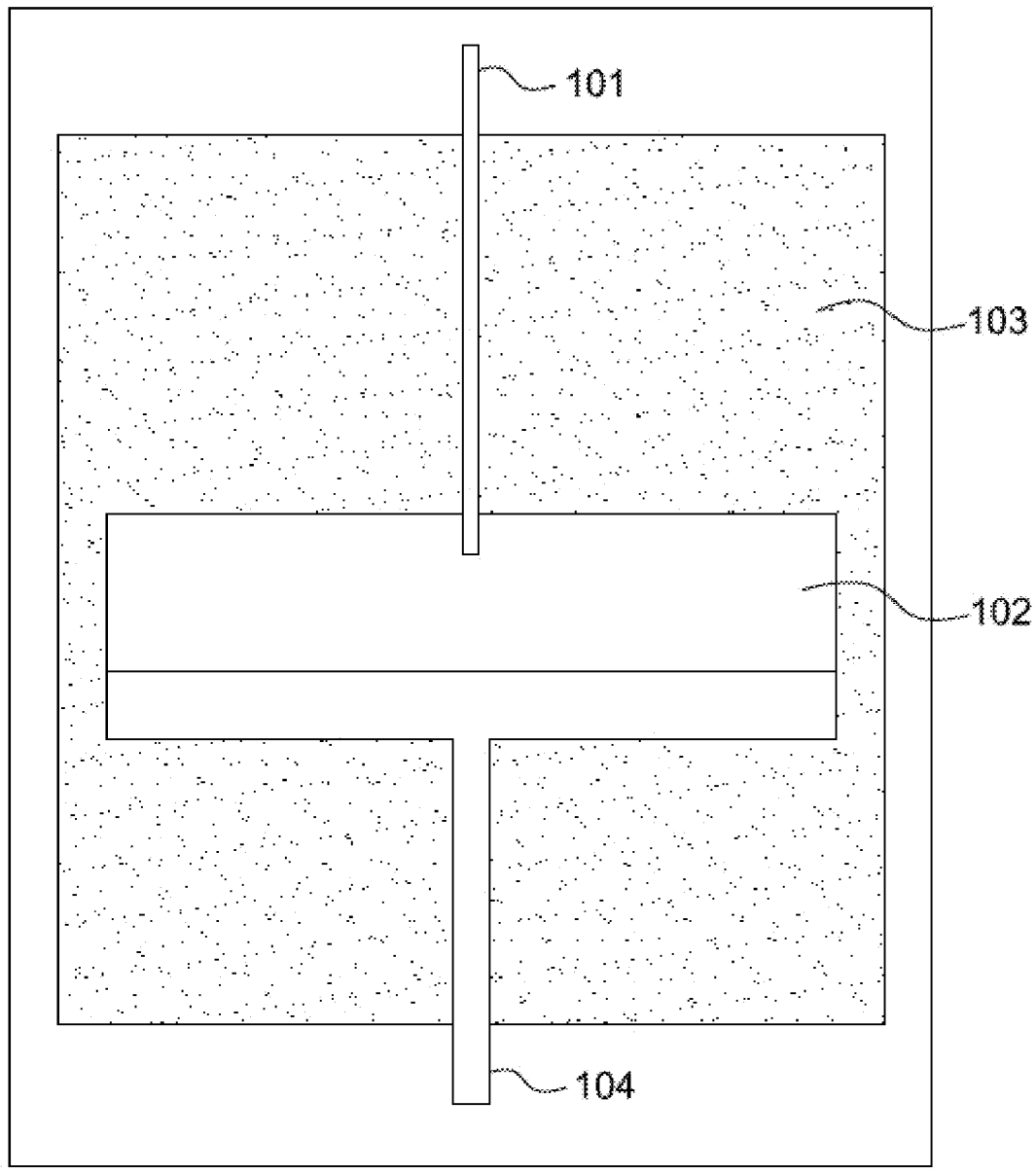
FIG. 1 is a schematic representation of the application of the AC voltage showing the needle electrode (101), composite plate (102), non-conductive liquid medium (103), and supporting ground electrode (104)

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "composite" refers to a combination of two or more distinct constituent materials into one continuous or discontinuous mass. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

According to a first aspect, the present disclosure relates to a method of making a polyolefin-perovskite nanomaterial composite. The method involves first mixing a perovskite nanomaterial with a polyolefin powder to form a mixture. In some embodiments, the polyolefin powder is present in an amount of 90 to 99 wt %, preferably 95 to 98 wt %, preferably 96 to 97.75 wt %, preferably 96.5 to 97.5 wt %, preferably 97 wt % based on a total weight of the mixture. In some embodiments, the perovskite nanomaterial is present in an amount of 1 to 10 wt %, preferably 2 to 5 wt %, preferably 2.25 to 4 wt %, preferably 2.5 to 3.5 wt %, preferably 3 wt % based on a total weight of the mixture.

Examples of polyolefins include polyethylene, polypropylene, polymethylpentene, polybutene-1, polyisobutylene, polystyrene, polyvinyl chloride, polybutadiene, and the like. In some embodiments, the polyolefin is polyethylene. In some embodiments, the polyethylene is low-density polyethylene (LDPE). In preferred embodiments, the polyolefin is LDPE having a density of 0.88 to 0.96 g/cm$^3$, preferably 0.89 to 0.95 g/cm$^3$, preferably 0.90 to 0.94 g/cm$^3$, preferably 0.91 to 0.93 g/cm$^3$. In preferred embodiments, the polyolefin is LDPE having a melt flow index of 0.2 to 2.5 g/10 minutes, preferably 0.25 to 1 g/10 minutes, preferably 0.3 to 0.5 g/10 minutes, preferably 0.35 to 0.45 g/10 minutes, preferably 0.40 g/10 minutes. In some embodiments, the LPDE is in the form of particles having a particle size distribution wherein greater than 90% of particles, preferably greater than 91% of particles, preferably greater than 92% of particles, preferably greater than 93% of particles, preferably greater than 94% of particles, preferably greater than 95% of particles have a particle size less than 600 μm, preferably less than 575 μm, preferably less than 550 μm, preferably less than 525 μm, preferably less than 500 μm.

As used herein "perovskite" refers to a material which has the perovskite structure type. The perovskite structure type is a structure adopted by materials which have the general formula ABX$_3$, where A and B are cations which have a ratio of charge on cation A to charge on cation B of 1:2 and X is an anion. Typical ion charge combinations are $A^+B^{2+}X^-_3$ and $A^{2+}B^{4+}X^{2-}_3$. The perovskite structure type is characterized by the presence of an octahedral coordination of the B cation by X anions. These octahedra are arranged in a cubic lattice and are vertex-sharing. The A cations occupy pockets with cubic symmetry defined by 8 of the octahedra. Typically, the arrangement of the octahedra and A cations forms a material with cubic symmetry, however slight distortions may lower the symmetry of the material, for example to tetragonal or orthorhombic. Examples of such distortions include shifts of the B cations such that they are not in the center of the octahedra (off-centering) and tilting of the octahedra such that the center of the octahedra remain in a cubic arrangement, but the orientation of the octahedra results in a non-cubic symmetry. The perovskite structure type is named after a mineral called perovskite, composed of calcium titanate (CaTiO$_3$), which crystallizes in the cubic perovskite structure type. The aforementioned mineral is a member of the class of materials known as "perovskites". Examples of other perovskites include simple perovskites, complex perovskites, layered perovskites, and hybrid perovskites.

Simple perovskites are perovskites which have chemical formulas which conform to the chemical formula explained above. Simple perovskites have only one type of atom occupying the B cation sites in the perovskite structure or fulfill the B cation position in the aforementioned chemical formula. Simple perovksites may have one or more type of atom occupying the A cation sites in the perovskite structure or fulfill the A cation position in the aforementioned chemical formula. Simple perovksites may have one or more type of atom occupying the X anion sites in the perovskite structure of fulfill the X anion position in the aforementioned chemical formula. This description also covers doped perovskites that are doped in both the A and X sites in the structure of A and X positions in the chemical formula. Examples of simple perovskites include calcium titanate (CaTiO$_3$, perovskite), bridgmanite ((Mg,Fe)SiO$_3$), bismuth niobate (BiNbO$_3$), barium titanate (BaTiO$_3$), strontium titanate (SrTiO$_3$), strontium zirconate (SrZrO$_3$), lead titanate (PbTiO$_3$), bismuth ferrite (BiFeO$_3$), lanthanum ytterbium oxide (LaYbO$_3$), lanthanum strontium manganite ((La,Sr)MnO$_3$), yttrium aluminum perovskite (YAlO$_3$, YAP), lutetium aluminum perovskite (LuAlO$_3$, LuAP), CsPbI$_3$, CsGeBr$_3$, RbPbI$_3$, CsSnBr$_3$, and RbSbI$_3$.

Complex perovskites are perovskites that have more than one type of atom occupying the B cation sites in the perovskite structure of fulfill the B cation position in the aforementioned chemical formula. Complex perovskites may be disordered complex perovskites or ordered complex perovskites. Disordered complex perovskites are complex perovskites where the B cation sites in the perovskite structure are filled with a random distribution of cations able to occupy said sites based on the chemical composition of the material. No long range ordering of the B cations exists. Examples of disordered complex perovskites include lead zirconate titanate (Pb(Zr,Ti)O$_3$, PZT), lead ferrite tantalate (Pb(Fe,Ta)O$_3$), lead scandium tantalate (Pb(ScTa)O$_3$, PST) barium manganite titanate (Ba(Mn,Ti)O$_3$, BMT), and barium manganite niobate (Ba(Mn,Nb)O$_3$, BMN). Ordered complex perovskites are complex perovskites which have long range order and symmetry to the cations occupying the B cations sites in the perovskite structure. An example of ordered complex perovskites are double perovskites, which have a 1:1 mixture of two different B cations, labeled B and B'. Double perovskites are denoted with the formula $AB_{0.5}B'_{0.5}X_3$ or $A_2BB'X_6$. Double perovskites have a similar crystalline unit cell as perovskites, but with dimensions that are twice as large as the parent, simple perovskites. Other examples of ordered complex perovskites have B:B' cation ratios of 1:2 ($AB_{0.33}B'_{0.67}X_3$) or 1:3 ($AB_{025}B'_{0.75}X_3$). Examples of ordered complex perovskites include Sr$_2$FeMoO$_6$, Sr$_2$NiIrO$_6$, and BaZn$_{0.33}$Ta$_{0.67}$O$_3$.

Layered perovksites are materials in which sheets of the ABX3 structure are separated by sheets of a different material. Layered perovskites may be classified based on the chemical formula of the different material into Aurivillius phase, Dion-Jacobson phase, and Ruddlesden-Popper phase layered perovskites. Aurivillius phase layered perovskites are materials in which the different material comprises [Bi$_2$O$_2$]$^{2+}$ ions occurring every n layers (where n is an integer from 1 to 5) to give a material with the overall formula Bi$_2$A$_{(n-1)}$B$_n$O$_{(3n+)}$ or [Bi$_2$O$_2$]-A$_{(n-1)}$ B$_n$O$_{(3n+1)}$. Examples of Aurivillius phase layered perovskites include [Bi$_2$O$_2$] BiTi$_2$O$_7$, Bi$_2$MoO$_6$, and SrBi$_2$Nb$_2$O$_9$. Dion-Jacobson phase layered perovskites are materials in which the different material is composed of an alkali metal layer ever n layers (where n is an integer from 1 to 5) to give a material with the overall formula MA$_{(n-1)}$B$_n$O$_{(3n+1)}$ where M is an alkali metal. Examples of Dion-Jacobson phase layered perovskites include KLaNb$_2$O$_7$, CsLaNb$_2$O$_7$, CsBa$_2$Ta$_3$O$_{10}$, and KSr$_2$Nb$_3$O$_{10}$. Ruddlesden-Popper phase layered perovskites are materials in which the different material is a layer of cations A', which may be any cations that would occupy an A cation site in a perovskite material, occurring every n layers, where n=1 or 2, giving the material the overall formula $A'_n A_{(n-1)} B_n O_{(3n+1)}$. Examples of Ruddlesden-Popper layered perovskites include $Sr_2RuO_4$, $Sr_3Ru_2O_7$, $Sr_2TiO_4$, $Ca_2MnO_4$, and $SrLaAlO_4$.

Hybrid perovskites are perovskite materials in which one or more of the cations is an organic cation such as ammonium, organoammonium, formamidinium. Examples of hybrid perovskites include methylammonium lead iodide ($CH_3NH_3PbI_3$), methylammonium tin bromine ($CH_3NH_3SnBr_3$), and formamidinium lead iodide ($NH_2CHNH_2PbI_3$).

In some embodiments, the perovskite nanomaterial is a simple perovskite material. In alternative embodiments, the perovskite material is a complex perovskite, a layered perovskite, or a hybrid perovskite. In preferred embodiments, the perovskite nanomaterial is barium titanate.

In some embodiments, the perovskite nanomaterial is in the form of nanoparticles. In some embodiments, the nanoparticles have a mean size of 100 to 500 nm, preferably 125 to 475 nm, preferably 150 to 450 nm, preferably 175 to 425 nm, preferably 200 to 300 nm. In some embodiments, the nanoparticles may have a spherical shape, or may be shaped like cylinders, boxes, blocks, spikes, flakes, plates, ellipsoids, toroids, stars, ribbons, discs, rods, granules, prisms, cones, platelets, sheets, angular chunks, terraced cubes, terraced rectangular prisms, or some other shape. In some embodiments, the nanoparticles may be substantially spherical, meaning that the distance from the nanoparticle centroid (center of mass) to anywhere on the nanoparticle outer surface varies by less than 30%, preferably by less than 20%, more preferably by less than 10% of the average distance. In some embodiments, the nanoparticles are in the form of blocks, granules, terraced rectangular prisms, or angular chunks, having a mean size in a range as previously described and having a largest dimension that is 50 to 500%, preferably 75 to 400, preferably 100 to 350%, preferably 150 to 250% of the range previously described and a smallest dimension that is 5 to 150, preferably 10 to 125, preferably 15 to 100, preferably 25 to 75% of the range previously described. In some embodiments, the nanoparticles may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean size that is at least 2 times the mean size of the primary particles, and preferably at least 90 volume percent of the clusters having a mean size that is at least 5 times the mean diameter of the primary particles. The primary particles may be the nanoparticles having a mean size as previously described. In some embodiments, the nanoparticles are monodisperse, having a coefficient of variation or relative standard deviation, expressed as a percentage and defined as the ratio of the nanoparticle size standard deviation ($\sigma$) to the nanoparticle size mean ($\mu$), multiplied by 100%, of less than 25%, preferably less than 10%, preferably less than 8%, preferably less than 6%, preferably less than 5%. In a preferred embodiment, the nanoparticles are monodisperse, having a nanoparticle size distribution ranging from 80% of the average particle size to 120% of the average nanoparticle size, preferably 85 to 115%, preferably 90 to 110% of the average particle size. In another embodiment, the nanoparticles are not monodisperse.

In some embodiments, the polyolefin-perovskite nanocomposite is substantially free of non-perovskite inorganic nanomaterials. Examples of non-perovskite inorganic nanomaterials include titanium dioxide nanomaterials, zinc oxide nanomaterials, silica nanomaterials, nanoclays, metal nanomaterials such as silver nanoparticles, gold nanoparticles, copper nanoparticles, and platinum nanoparticles, iron oxide nanomaterials, aluminum oxide nanomaterials calcium carbonate nanomaterials, magnesium oxide nanomaterials. In some embodiments, the polyolefin-perovskite nanocomposite is substantially free of carbon nanomaterials. Examples of carbon nanomaterials include carbon nanotubes, fullerenes, fullerene whiskers, carbon nanobuds, carbon nanoscrolls, activated carbon, carbon black, graphene, and graphene oxide.

The mixing may be performed using equipment such as a V blender, a ribbon blender, a twin-screw continuous blender, a single screw blender, a double cone blender, a planetary mixer, a double planetary mixer, a paddle mixer, a tumbling mixer, a drum blender, a horizontal mixer, or the like.

The method next involves optionally milling the mixture to form a composite powder. The mixture may be milled by a technique such as milling, grinding, ball milling, chopping, pulverizing, crushing, pounding, mincing, shredding, smashing, fragmenting, or another technique that may be used to reduce a material to small particles. In some embodiments, the milling may take place using a mill, ball mill, rod mill, autogenous mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles. In some embodiments, the milling is ball milling. In some embodiments, the ball milling takes place in a high-energy ball mill. Non-limiting examples of milling media (i.e. bowl and balls) include zirconium dioxide, tungsten carbide, silicon nitride, and alumina. In one embodiment, zirconium dioxide milling media is employed to minimize contamination of the powder mixture. The balls used for milling may have a diameter of 200 to 1,000 preferably 300 to 900 preferably 400 to 800 preferably 600 to 650 though balls with diameters smaller than 200 or greater than 1,000 may be used. In one embodiment, a weight ratio of the balls to the powder mixture ranges from 4:1 to 35:1, preferably from 5:1 to 30:1, preferably from 7.5:1 to 25:1, preferably from 9:1 to 15:1. In some embodiments, the milling is performed in an inert atmosphere, preferably provided by inert gas such as argon gas, though in another embodiment, the milling may be performed in air. In some embodiments, the milling is performed at ambient temperature (i.e. 23 to 26° C.). The mixture may be milled for up to 10 hours, or up to 5 hours, or up to 2 hours, preferably for 10 to 90 minutes, preferably for 30 to 75 minutes, preferably for 35 to 50 minutes, preferably for 40 minutes. A high-energy ball milling apparatus may use a rotation rate of 500 to 10,000 rpm, preferably 750 to 5,000 rpm, preferably 1,000 to 3,250 rpm, preferably 1,025 to 2,500 rpm, preferably 1,050 to 2,000 rpm. Preferably, the ball milling decreases the size of the particles by 30-95%, preferably 40-90%, more preferably 60-90% relative to a size of the particles before the ball milling.

In some embodiments, the composite powder comprises particles of polyolefin and particles of perovskite nanomaterial. In some embodiments, the particles of polyolefin have a particle size of 1 nm to 1000 µm, preferably 10 nm to 500 µm, preferably 100 nm to 100 µm, preferably 500 nm to 50

μm. In some embodiments, the particles of polyolefin may have a spherical shape, or may be shaped like cylinders, boxes, blocks, spikes, flakes, plates, ellipsoids, toroids, stars, ribbons, discs, rods, granules, prisms, cones, platelets, sheets, angular chunks, cubes, rectangular prisms, or some other shape. In some embodiments, the particles of polyolefin may be substantially spherical, meaning that the distance from the particle centroid (center of mass) to anywhere on the particle outer surface varies by less than 30%, preferably by less than 20%, more preferably by less than 10% of the average distance. In some embodiments, the particles of polyolefin are in the form of blocks, granules, rectangular prisms, or angular chunks, having a mean size in a range as previously described and having a largest dimension that is 50 to 500%, preferably 75 to 400, preferably 100 to 350%, preferably 150 to 250% of the range previously described and a smallest dimension that is 5 to 150, preferably 10 to 125, preferably 15 to 100, preferably 25 to 75% of the range previously described. In some embodiments, the particles of polyolefin are monodisperse, having a coefficient of variation or relative standard deviation, expressed as a percentage and defined as the ratio of the particle size standard deviation ($\alpha$) to the particle size mean ($\mu$), multiplied by 100%, of less than 25%, preferably less than 10%, preferably less than 8%, preferably less than 6%, preferably less than 5%. In a preferred embodiment, the particles of polyolefin are monodisperse, having a particle size distribution ranging from 80% of the average particle size to 120% of the average particle size, preferably 85 to 115%, preferably 90 to 110% of the average particle size. In another embodiment, the particles of polyolefin are not monodisperse.

The method next involves molding the composite powder to form a composite plate. In some embodiments, the molding is performed via blow molding, compression molding, extrusion molding, injection molding, laminating, matrix molding, rotational molding, spin casting, transfer molding, thermoforming, vacuum forming, or a similar technique known by one of ordinary skill in the art. In some embodiments, the molding is compression molding. In preferred embodiments, the compression molding is performed with a hot press mold. In some embodiments, the temperature of the compression molding is 30 to 177° C., preferably 35 to 172° C., preferably 40 to 167° C., preferably 50 to 162° C., preferably 80 to 160° C., preferably 100 to 155° C., preferably 125 to 152.5° C., preferably 150° C. In some embodiments, the compression molding is performed at a pressure of 0.01 bar to 150 bar, preferably 0.1 bar to 100 bar, preferably 0.15 bar to 75 bar, preferably 0.25 bar to 50 bar, preferably 0.4 bar to 25 bar, preferably 0.5 bar to 15 bar. In some embodiments, the compression molding involves application of pressure for 1 to 20 minutes, preferably 2 to 19 minutes, preferably 3 to 18 minutes, preferably 4 to 17 minutes, preferably 5 to 15 minutes. In some embodiments, the compression molding comprises two steps performed at different pressures in the range specified above, each step lasting a time in the range specified above. In some embodiments, the first step is performed at a pressure of 0.1 to 0.9 bar, preferably 0.2 to 0.8 bar, preferably 0.3 to 0.7 bar, preferably 0.4 to 0.6 bar, preferably 0.45 to 0.55 bar, preferably 0.5 bar for 1 to 20 minutes, preferably 2.5 to 17.5 minutes, preferably 5 to 15 minutes, preferably 7.5 to 12.5 minutes, preferably 10 minutes. In some embodiments, the second step is performed at a pressure of 10 to 150 bar, preferably 11 to 100 bar, preferably 12 to 75 bar, preferably 13 to 50 bar, preferably 14 to 25 bar, preferably 14.5 to 15.5 bar, preferably 15 bar for 1 to 20 minutes, preferably 2 to 15 minutes, preferably 3 to 10 minutes, preferably 4 to 7.5 minutes, preferably 5 minutes. The composite plate comprises a polyolefin matrix and particles of perovskite nanomaterial. In some embodiments, the particles of perovskite nanomaterial are uniformly distributed throughout the polyolefin matrix. In some embodiments, the particles of polyolefin present in the composite powder are formed into the polyolefin matrix of the composite plate by sintering of the particles of polyolefin. In alternative embodiments, the particles of polyolefin present in the composite powder are formed into the polyolefin matrix of the composite plate by melting of the particles of polyolefin. In preferred embodiments, the composite plate has a thickness of 1 μm to 100 mm, preferably 10 μm to 50 mm, preferably 100 μm to 25 mm.

In some embodiments, the composite plate has a real dielectric permittivity of 2.0 to 3.0 at 1 kHz, preferably 2.1 to 2.75, preferably 2.2 to 2.5, preferably 2.25 to 2.45, preferably 2.3 to 2.4 at 1 kHz.

The composite plate is then subjected to an AC voltage to form the polyolefin-perovskite nanomaterial composite. In some embodiments, the AC voltage is 1 to 50 kV, preferably 2.5 to 47.5 kV, preferably 5 to 45 kV, preferably 7.5 to 42.5 kV, preferably 10 to 40 kV, preferably 12.5 to 35 kV, preferably 15 to 30 kV, preferably 17.5 to 25 kV, preferably 20 kV. The AC voltage applied divided by the distance which separates the supporting ground electrode and the needle electrode is preferably below the breakdown voltage of the polyolefin measured in kV/cm. In preferred embodiments, the AC voltage has a frequency of 50 to 70 Hz, preferably 55 to 65 Hz, preferably 60 Hz. In some embodiments, the AC voltage is applied by placing the composite plate on a supporting ground electrode and placing a needle electrode into the composite plate such that the needle electrode does not contact the supporting ground electrode (a situation which would result in a short circuit). In some embodiments, the supporting ground electrode and needle electrode are separated by a distance of at least 30%, preferably at least 40%, preferably at least 50%, preferably at least 55%, preferably at least 60%, preferably at least 70%, preferably at least 75%, preferably at least 80%, preferably at least 85%, preferably at least 90% of a thickness of the composite plate. In some embodiments, the supporting ground electrode, composite plate, and needle electrode are immersed in a non-conductive liquid medium during the subjecting. Examples of non-conductive liquid media for the aforementioned subjecting include silicon oil, mineral oil, vegetable oil, non-conductive coolant, glycerol, ethylene glycol, propylene glycol, and the like, but excluding distilled water. In some embodiments, the non-conductive liquid medium is mineral oil.

The applied AC voltage induces electrical damage or partial dielectric breakdown in the polyolefin matrix. In some embodiments, the electrical damage or partial dielectric breakdown is a voltage-induced phenomenon. In some embodiments, current may flow from the needle electrode to the supporting ground electrode, but such a current is not necessary for the electrical damage or partial dielectric breakdown of the polyolefin. In some embodiments, the applied AC voltage induces electrical damage or partial dielectric breakdown without a flow of current between the electrodes. This electrical damage causes the formation of electrically and thermally conductive pathways. Initially, these electrically and thermally conductive pathways form at the needle electrode and propagate outward from the needle electrode. As these electrically and thermally conductive pathways propagate, the pathways branch and form a dendritic structure beginning at the site of the needle electrode and traveling outward from it in a direction generally toward the supporting ground electrode. The direction generally toward the supporting ground electrode may be characterized as a cone the sides of which encompass the entirety of the electrically and thermally conductive pathways and described by an angle at which the sides meet. In some embodiments, the cone has an angle of less than 180°, preferably less than 150°, preferably less than 120°, preferably less than 90°, preferably less than 60°. In some embodiments, the ratio of the maximum horizontal distance from the needle electrode to an electrically and thermally conductive pathway to the maximum vertical distance from the needle electrode to an electrically and thermally conductive pathway is 1:1 to 1:100, preferably 1:2 to 1:90, preferably 1:3 to 1:80, preferably 1:4 to 1:75, preferably 1:5 to 1:60, preferably 1:6 to 1:50, preferably 1:7 to 1:40, preferably 1:8 to 1:35, preferably 1:9 to 1:30, preferably 1:10 to 1:25. As used herein, horizontal means in a direction perpendicular to the direction of the shortest line spanning from the needle electrode to the supporting ground electrode. As used herein, vertical means in a direction parallel to the direction of the shortest line spanning from the needle electrode to the supporting ground electrode. The above description of the direction generally toward the supporting ground electrode defines the orientation of the electrically and thermally conductive pathways and the preferential propagation in a direction parallel to the direction of the shortest line spanning from the needle electrode to the supporting ground electrode compared to the propagation in a direction perpendicular to the direction of the shortest line imagined spanning from the needle electrode to the supporting ground electrode makes the electrically and thermally conductive pathways oriented electrically and thermally conductive pathways and distinct from non-oriented electrically and thermally conductive pathways, which would be characterized by isotropic propagation outward from the needle electrode. The shape of the dendritic structure of the oriented electrically and thermally conductive pathways is also known as a "lightning tree" or "Lichtenberg figure".

In some embodiments, the oriented electrically and thermally conductive pathways have a higher dielectric permittivity than portions of the composite lacking said pathways. In some embodiments, the presence of the oriented electrically and thermally conductive pathways imparts unto the composite a higher dielectric permittivity compared to a composite lacking said pathways.

In some embodiments, the oriented electrically and thermally conductive pathways are comprised of hollow channels in the polyolefin matrix. In some embodiments, the oriented electrically and thermally conductive pathways are comprised of material formed from electrical damage or partial dielectric breakdown of the polyolefin matrix that has a distinct composition from the polyolefin matrix. Such distinction may come in the form of a different crystallinity or percent crystallinity, a different average chain length, a different percent crosslinking, a different crosslinking density, oxidation of the polyolefin, carbonization of the polyolefin, charring of the polyolefin, combustion of the polyolefin, or depolymerization of the polyolefin. In some embodiments, the application of the AC voltage results in melting of the polyolefin matrix localized to the oriented electrically and thermally conductive pathways. Such melting may change the properties of the polyolefin such as different crystallinity or percent crystallinity, percent crosslinking, or crosslinking density of the polyolefin. In some embodiments, the application of the AC voltage results in changes to the chemical structure of the polyolefin such as oxidation, carbonization, charring, combustion, or depolymerization of the polyolefin. In some embodiments, the aforementioned changes to the chemical structure of the polyolefin are the result of thermal processes. In some embodiments, the aforementioned changes to the chemical structure of the polyolefin are the result of electrochemical processes. In some embodiments, the aforementioned changes to the chemical structure of the polyolefin are the result of both thermal and electrochemical processes. The oriented electrically and thermally conductive pathways may originate at either the site of the needle electrode, branch from an existing oriented electrically and thermally conductive pathway, or from a particle of the perovskite nanomaterial embedded in the polyolefin matrix. The oriented electrically and thermally conductive pathways may terminate at either a particle of the perovskite nanomaterial embedded in the polyolefin matrix or a surface of the nanocomposite. In some embodiments, a single oriented electrically and thermally conductive pathway, acts as a portion of a path along which electricity may flow, the path comprising at least one oriented electrically and thermally conductive pathway and optionally comprising one or more additional oriented electrically and thermally conductive pathways and/or one or more particles of perovskite nanomaterial.

In some embodiments, the aforementioned hollow channels have a mean thickness of 0.01 to 2 μm, preferably 0.05 to 1.75 μm, preferably 0.1 to 1.5 μm, preferably 0.15 to 1.25 μm, preferably 0.2 to 1.0 μm, preferably 0.25 to 0.9 μm. In some embodiments, the material formed from electrical damage or partial dielectric breakdown of the polyolefin matrix is present as tubes having a mean thickness of 0.01 to 2 μm, preferably 0.05 to 1.75 μm, preferably 0.1 to 1.5 μm, preferably 0.15 to 1.25 μm, preferably 0.2 to 1.0 μm, preferably 0.25 to 0.9 μm. In some embodiments, the aforementioned hollow channels or tubes have a tapered shape, meaning the thickness of the hollow channel or tube decreases by 10 to 90%, preferably by 15 to 85%, preferably by 20 to 80%, preferably by 25 to 75% when measured along the hollow channel or tube from a thick end (one having a greater thickness) to a thin end (one have a lesser thickness). In alternative embodiments, the hollow channels or tubes do not have a tapered shape. In some embodiments, a hollow channel or tube has a maximum thickness that is less than 250%, preferably less than 225%, preferably less than 200%, preferably less than 175%, preferably less than 150% of the mean thickness of that hollow channel or tube. In some embodiments, a hollow channel or tube has a minimum thickness that is greater than 10%, preferably greater than 25%, preferably greater than 35%, preferably greater than 50% of the mean thickness of that hollow channel or tube. In some embodiments, two or more individual hollow channels or tubes may intersect to form regions in which the overall size of the region is greater than the thickness of an individual hollow channel or tube.

In some embodiments, the number and extent of the oriented electrically and thermally conductive pathways may be changed by the duration of the subjecting of the composite to the AC voltage. In some embodiments, the maximum distance from the end of the needle electrode to the end of an oriented electrically and thermally conductive pathway is 1 to 5 mm, preferably 1.5 to 4.5 mm, preferably 2 to 4 mm, preferably 2.1 to 3.9 mm, preferably 2.2 to 3.8 mm, preferably 2.3 to 3.7 mm, preferably 2.4 to 3.6 mm, preferably 2.5 to 3.5 mm, preferably 2.6 to 3.4 mm, preferably 2.7 to 3.3 mm, preferably 2.8 to 3.2 mm, preferably 2.9 to 3.1 mm after subjecting the composite to the AC voltage for a duration of 500 to 1500 seconds, preferably 550 to 1450 seconds, preferably 600 to 1400 seconds, preferably 650 to 1350 seconds, preferably 700 to 1300 seconds, preferably 750 to 1250 seconds, preferably 800 to 1200 seconds, preferably 850 to 1150 seconds, preferably 900 to 1100 seconds, preferably 1000 to 1050 seconds, preferably 1025 seconds. In some embodiments, increasing the number and extent of the oriented electrically and thermally conductive pathways increases the electrical and/or thermal conductivity of the polyolefin-perovskite nanomaterial composite. In some embodiments, increasing the number and extent of the oriented electrically and thermally conductive pathways increases the dielectric permittivity of the polyolefin-perovskite nanomaterial composite. In some embodiments, increasing the number and extent of the oriented electrically and thermally conductive pathways has disadvantageous effects on other properties of the polyolefin-perovskite nanomaterial composite such as the Young's modulus, toughness, ductility, and % elongation. In some embodiments, the subjecting of the AC voltage is performed for a time to achieve desired electrical conductivity, thermal conductivity, Young's modulus, toughness, ductility, and % elongation of the polyolefin-perovskite nanomaterial composite.

This method may be distinguished from method for determining the breakdown voltage of a polymer or polymer composite using a needle electrode and a supporting ground electrode in the following ways. First, to determine a voltage at which total electrical breakdown occurs, a voltage at least equal to the breakdown voltage must be applied. While lower voltages are necessarily applied before reaching the breakdown voltage, a method for determining the breakdown voltage continues to apply higher voltages until total electrical breakdown occurs. The method described here, however, relies on voltages below the breakdown voltage for the polyolefin. The voltage is high enough to cause electrical damage to the polyolefin, but is not high enough to cause total dielectric breakdown. Second, the method described here is reliant on tailoring the number and extent of the electrically and thermally conductive pathways present in the material to achieve a desired value of electrical and/or thermal conductivity and/or dielectric permittivity. Thus, it is advantageous to control the number and extent of the electrically and thermally conductive pathways present in the polyolefin-perovskite nanomaterial composite in order to balance the advantageous effects these pathways have on the electrical and thermal conductivity and/or dielectric permittivity of the composite with the disadvantageous effects these pathways may have on other properties of the composite such as the Young's modulus, toughness, ductility, and % elongation. A method for determining the breakdown voltage has no need to take these other properties into account and would be rendered useless if the method was aborted before total dielectric breakdown occurred because of a change in a property such as toughness.

In some embodiments, the polyolefin-perovskite nanomaterial composite has a thermal conductivity thermal conductivity of 0.1 $Wm^{-1}K^{-1}$ to 500 $Wm^{-1}K^{-1}$, preferably 0.2 $Wm^{-1}K^{-1}$ to 400 $Wm^{-1}K^{-1}$, preferably 0.3 $Wm^{-1}K^{-1}$ to 300 $Wm^{-1}K^{-1}$, preferably 0.4 $Wm^{-1}K^{-1}$ to 200 $Wm^{-1}K^{-1}$, preferably 0.5 $Wm^{-1}K^{-1}$ to 150 $Wm^{-1}K^{-1}$, preferably 0.6 $Wm^{-1}K^{-1}$ to 100 $Wm^{-1}K^{-1}$. In some embodiments, the polyolefin-perovskite nanomaterial composite has an electrical conductivity of $10^{-12}$ S/m to $10^2$ S/m, preferably $10^{-11}$ to $10^1$ S/m, preferably $10^{-10}$ S/m to $10^0$ S/m, preferably $10^{-9}$ S/m to $10^{-1}$ S/m, preferably $10^{-8}$ S/m to $10^{-2}$ S/m. In some embodiments, the polyolefin-perovskite nanomaterial composite has a dielectric permittivity of 3.1 to 50 at 1 kHz, preferably 3.25 to 40, preferably 3.5 to 35, preferably 4.0 to 30, preferably 4.5 to 25, preferably 4.75 to 22.5, preferably 5.0 to 20 at 1 kHz.

According to a second aspect, the present disclosure relates to a polyolefin-perovskite nanomaterial composite. The composite comprises a polyolefin matrix, perovskite nanomaterial, and oriented electrically and thermally conductive pathways formed from partial electrical damage of the polyolefin matrix. In some embodiments, the polyolefin matrix is present in an amount of 90 to 99 wt %, preferably 95 to 98 wt %, preferably 96 to 97.75 wt %, preferably 96.5 to 97.5 wt %, preferably 97 wt % based on a total weight of the composite. In some embodiments, the perovskite nanomaterial is present in an amount of 1 to 10 wt %, preferably 2 to 5 wt %, preferably 2.25 to 4 wt %, preferably 2.5 to 3.5 wt %, preferably 3 wt % based on a total weight of the composite.

In some embodiments, the polyolefin is polyethylene as described above. In some embodiments, the polyethylene is low-density polyethylene (LDPE) as described above. In preferred embodiments, the polyolefin is LDPE having a density as described above. In preferred embodiments, the polyolefin is LDPE having a melt flow index as described above.

The perovskite nanomaterial may be a perovskite material as described above. In some embodiments, the perovskite nanomaterial is barium titanate. In some embodiments, the perovskite nanomaterial is present as nanoparticles as described above.

The electrically and thermally conductive channels take the form of a dendritic structure beginning at the site of the needle electrode and traveling outward from it in a direction generally toward the supporting ground electrode as described above.

In some embodiments, the oriented electrically and thermally conductive pathways are comprised of hollow channels in the polyolefin matrix as described above. In some embodiments, the oriented electrically and thermally conductive pathways are comprised of material formed from full or partial dielectric damage of the polyolefin matrix that has a distinct chemical composition from the polyolefin matrix as described above. In some embodiments, a single oriented electrically and thermally conductive pathway, acts as a portion of a path along which electricity may flow, the path comprising at least one oriented electrically and thermally conductive pathway and optionally comprising one or more additional oriented electrically and thermally conductive pathways and/or one or more particles of perovskite nanomaterial as described above.

In some embodiments, the polyolefin-perovskite nanomaterial composite has a thermal conductivity thermal conductivity as described above. In some embodiments, the polyolefin-perovskite nanomaterial composite has an electrical conductivity as described above. In some embodiments, the polyolefin-perovskite nanomaterial composite has a dielectric permittivity as described above.

The examples below are intended to further illustrate protocols for preparing, characterizing the polyolefin-perovskite nanomaterial composite and uses thereof, and are not intended to limit the scope of the claims.

EXAMPLES

Preparation of the Composite Block

A polyethylene/barium titanate nanoparticle composite was prepared by a ball milling process. First, barium titanate nanoparticles were manually premixed into polyethylene powder. The mixture consisted of 97 wt % of polyethylene with 3 wt % of barium titanate nanoparticles. The polyethylene was an additive free, low density polyethylene (LDPE) powder having a density of 0.922 g/cm$^3$, melt flow index of 0.4 g/10 min and a typical particle size distribution with 95% of particles less than 500 purchased from Marplex Australia. The powder mixture was then ball milled in a high-energy shaker mill. Milling was performed in a zirconium oxide crucible with a weight ratio of balls to powder mixture of 10:1. Milling was performed in air at ambient temperature (23° C.) at a rotation rate of 1050 to 2000 rpm. Total milling time was 40 minutes. The obtained nanocomposites powder was press-molded to form thin blocks using a hot press and then, a sharp needle was casted into polyethylene composite block to form a needle electrode geometry. The press-molding was performed at a temperature of 150° C. The press-molding used a two-step process, the first step pressing at 0.5 bar for 10 minutes, and the second step pressing at 15 bar for 5 minutes. The polyethylene composite block had a width of 30 mm, a height of 30 mm, and a thickness of 10 mm. The separation between the electrodes was 3 mm.

Application of the AC Voltage

The complete setup was immersed in mineral oil. Subsequently, a constant AC high voltage of 20 kV and 60 Hz was applied between the sharp needle and the plane (ground) electrode. A depiction of the setup used for the application of the AC voltage is shown in FIG. 1, with the needle electrode (101), composite plate (102), non-conductive liquid medium (103), and supporting ground electrode (104) visible.

Figure 2A:
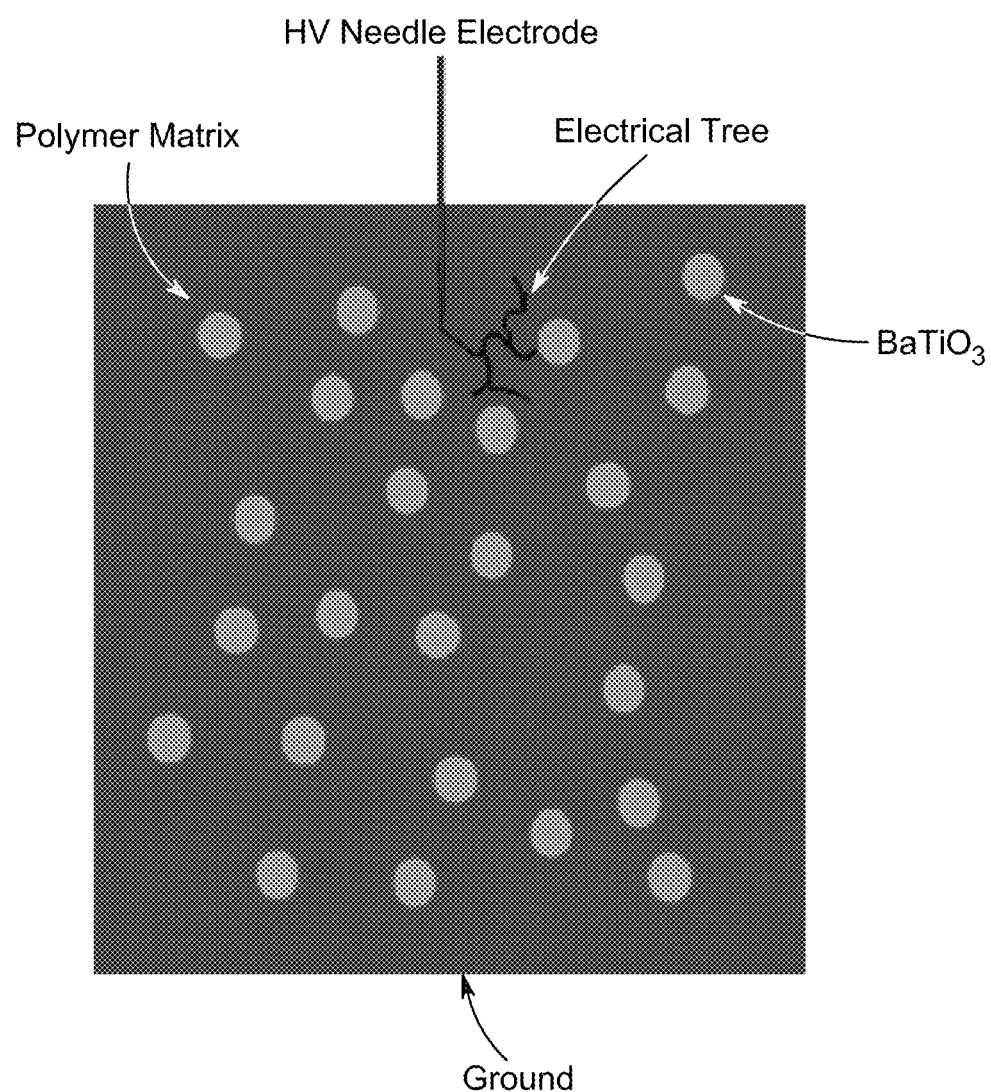
FIG. 2A is a schematic representation of the application of the AC voltage showing the needle electrode, polymer matrix, $BaTiO_3$ nanoparticles, supporting ground electrode, and the initiation of an oriented electrically and thermally conductive pathway at the site of the needle electrode under application high AC voltage.
Figure 2B:
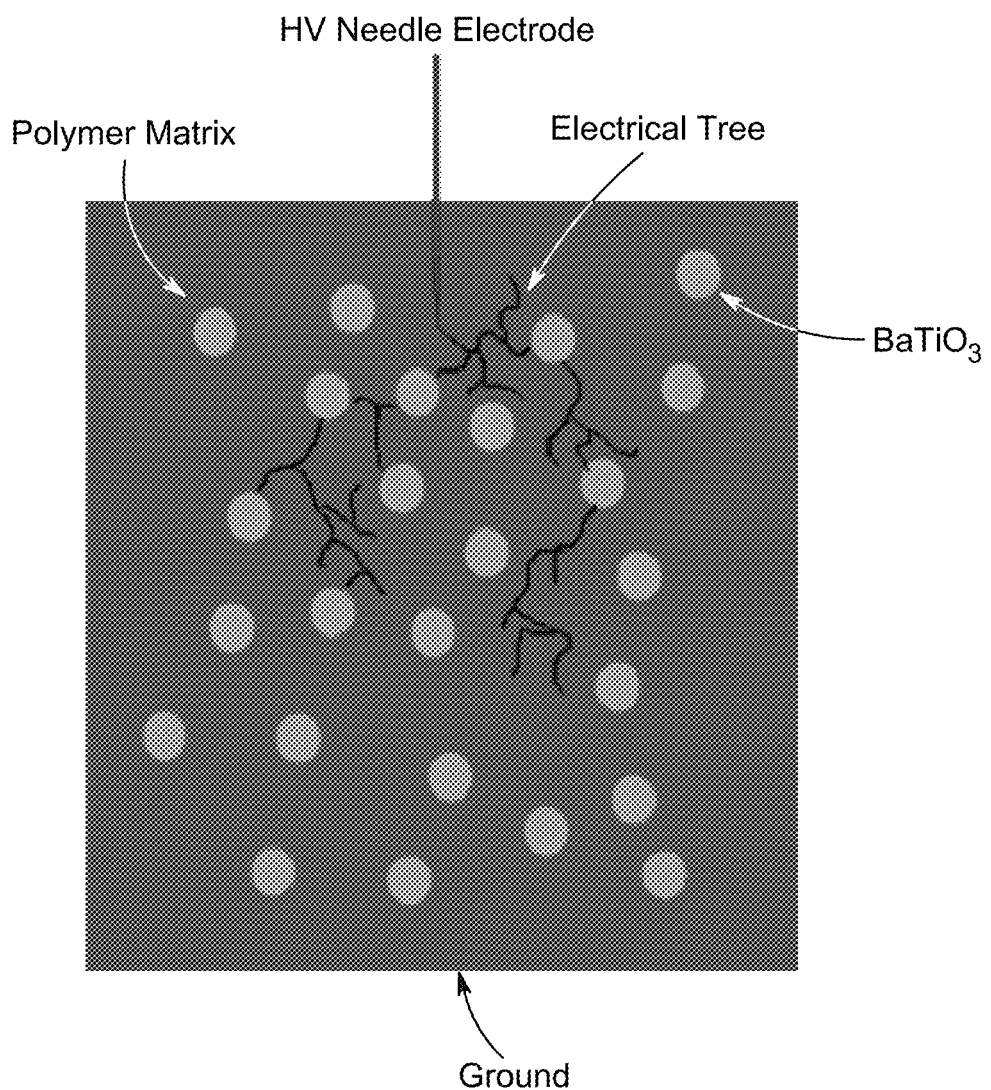
FIG. 2B shows propagation and branching of an oriented electrically and thermally conductive pathway and the beginning formation of the dendritic structure of the oriented electrically and thermally conductive pathways.
Figure 2C:
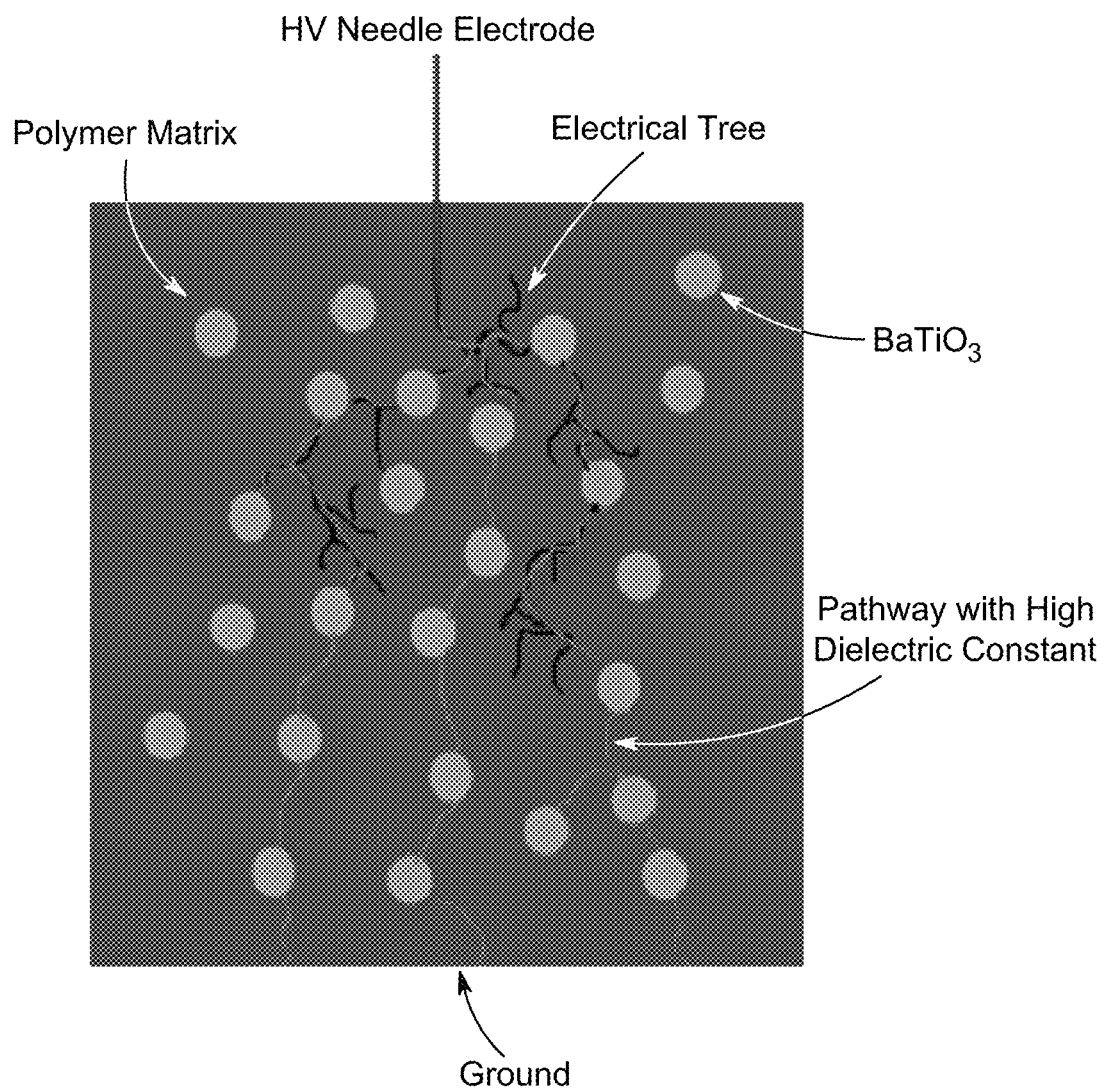
FIG. 2C shows complete formation of dendritic structure of the oriented electrically and thermally conductive pathways with complete paths along which electricity may flow.

FIGS. 2A-2C depict the possible mechanism of tree growth in the polymer matrix filled with barium titanate nanoparticles. The needle electrode is shown embedded in the polyolefin matrix with barium titanate nanoparticles dispersed in it and supported by the supporting ground electrode. Over a period of time, high local electric stress leads to the formation of the conducting channel, which could initiate the electrical tree from the needle (FIG. 2A). After propagating from the needle electrode, through the polymer matrix, along the barium titanate nanoparticles interface, but not yet reaching the supporting ground electrode, the conductive trees propagate to another barium titanate nanoparticle through the polymer matrix (FIG. 2B). After propagating from the needle electrode, through the polymer matrix, along the barium titanate nanoparticles interface, and after reaching the supporting ground electrode, the conductive trees bridge the gaps between barium titanate nanoparticles and form a plurality of oriented electrically and thermally conductive pathways which leads to an improvement in the electrical and thermal conductivity and dielectric permittivity of the polymer composite (FIG. 2C).

The final dielectric permittivity and electrical and thermal conductivity of the composite can be tuned by controlling the time ($t_1$) of the applied high voltage. As $t_1$ increases the number of propagated trees increases leading to an improved electrical conductivity. The trees had an average growth rate of 0.0029 mm/sec. Total time of the applied high voltage was 1025 to 1027 seconds for a sample with electrode separation of 3 mm.

To reach high dielectric permittivity and electrical and thermal conductivity and protect the nanocomposite material from total dielectric breakdown, the applied voltage should be stopped a few seconds before the dielectric breakdown takes place.

The invention claimed is:

1. A polyolefin-perovskite nanomaterial composite, comprising:
a polyolefin matrix in an amount of 90 to 99 wt %, based on a total weight of the polyolefin-perovskite nanomaterial composite;
perovskite nanomaterial present in an amount of 1 to 10 wt %, based on a total weight of the polyolefin-perovskite nanomaterial composite; and
oriented electrically and thermally conductive pathways that are hollow channels and/or electrically damaged polyolefin matrix having a chemical composition different from the polyolefin matrix,
wherein the oriented electrically and thermally conductive pathways have a length of from 1 to 5 mm and a tapered shape with mean thickness of 0.05 to 2 μm.

2. The polyolefin-perovskite nanomaterial composite of claim 1, wherein the polyolefin matrix comprises polyethylene.

3. The polyolefin-perovskite nanomaterial composite of claim 2, wherein the polyethylene is low density polyethylene.

4. The polyolefin-perovskite nanomaterial composite of claim 3, wherein the low density polyethylene has a density of 0.88 to 0.96 g/cm$^3$ and a melt flow index of 0.2 to 2.5 g/10 minutes.

5. The polyolefin-perovskite nanomaterial composite of claim 1, wherein the perovskite nanomaterial is barium titanate nanoparticles.

6. The polyolefin-perovskite nanomaterial composite of claim 1, wherein the oriented electrically and thermally conductive pathways comprise dendritic conductive channels in the polyolefin matrix which terminate at and originate from at least one selected from the group consisting of an exterior surface of the composite, a channel created by the needle electrode, and a particle of the perovskite nanomaterial.

7. The polyolefin-perovskite nanomaterial composite of claim 1, wherein the polyolefin-perovskite nanomaterial composite has a thermal conductivity of 0.1 Wm$^{-1}$K$^{-1}$ to 500 Wm$^{-1}$K$^{-1}$, an electrical conductivity of $10^{-12}$ S/m to $10^2$ S/m, and a dielectric permittivity of 3.1 to 50 at 1 kHz.

8. The polyolefin-perovskite nanomaterial composite of claim 1, wherein the electrically and thermally conductive pathways originate at a point and propagate outward from the point as a cone-shaped dendritic structure.

* * * * *